Oct. 20, 1931.    L. H. HILL    1,827,813
FLOW INDICATOR
Filed Sept. 8, 1923    2 Sheets-Sheet 1
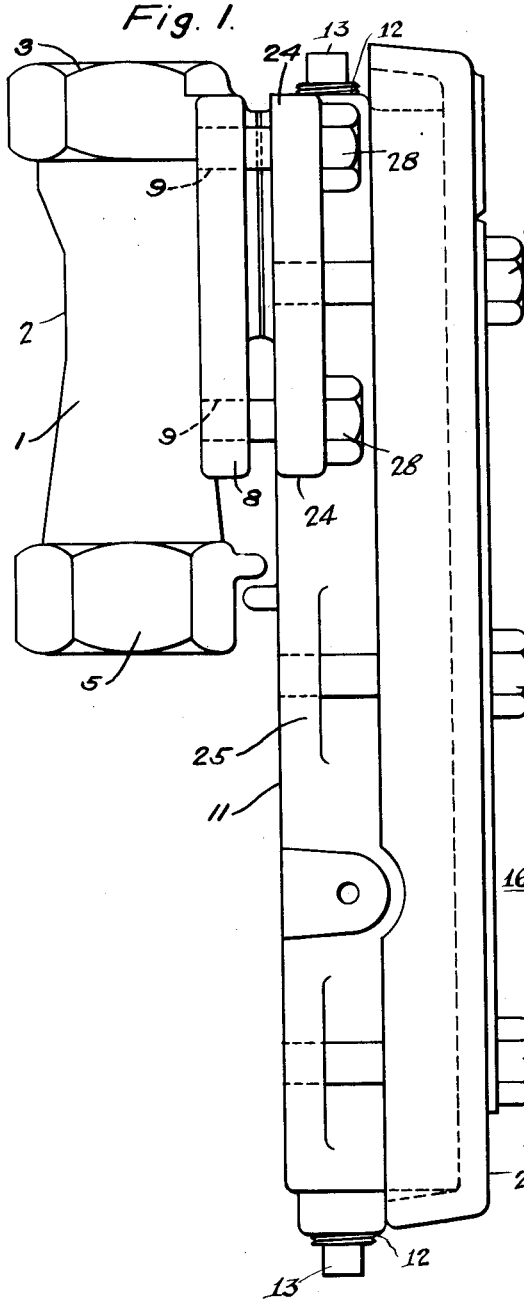
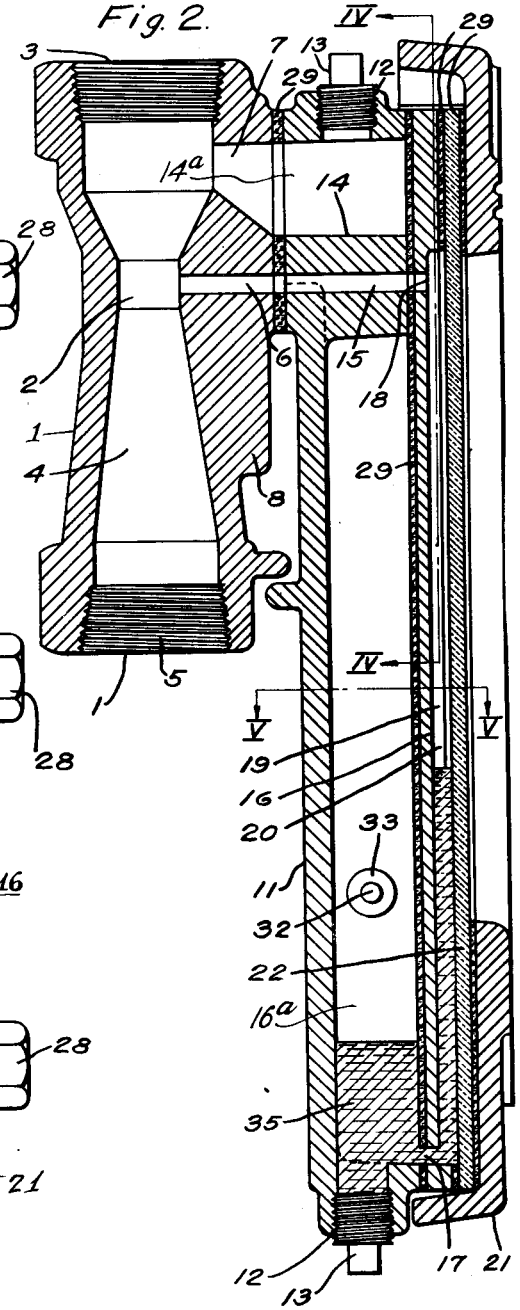
WITNESSES:
INVENTOR
Leland H. Hill.
BY
ATTORNEY Oct. 20, 1931.    L. H. HILL    1,827,813
FLOW INDICATOR
Filed Sept. 8, 1923    2 Sheets-Sheet 2

WITNESSES:
S. H. Voelker
Lester J. Budlong

INVENTOR
Leland H. Hill.
BY
Wesley G. Carr
ATTORNEY

Patented Oct. 20, 1931

1,827,813

UNITED STATES PATENT OFFICE

LELAND H. HILL, OF WILKINSBURG, PENNSYLVANIA, ASSIGNOR TO WESTINGHOUSE ELECTRIC & MANUFACTURING COMPANY, A CORPORATION OF PENNSYLVANIA

FLOW INDICATOR

Application filed September 8, 1923. Serial No. 661,550.

My invention relates to flow indicators and more particularly to a combined Venturi tube and a manometer.

One object of my invention is to provide a combined Venturi tube and manometer of such structural form that they may be mounted as a unit in a pipe line.

Another object of my invention is to provide a combined Venturi tube and manometer in which the Venturi tube supports the manometer.

A further object of my invention is to provide a manometer comprising a small number of easily manufactured parts in which there are no mechanical moving parts or springs.

In the accompanying drawings,

Figure 1 is a side elevational view of a combined Venturi tube and manometer embodying my invention.

Fig. 2 is a sectional view thereof taken on the line II—II of Fig. 5.

In the several figures of the drawings, similar reference numerals indicate like parts.

Figure 3:
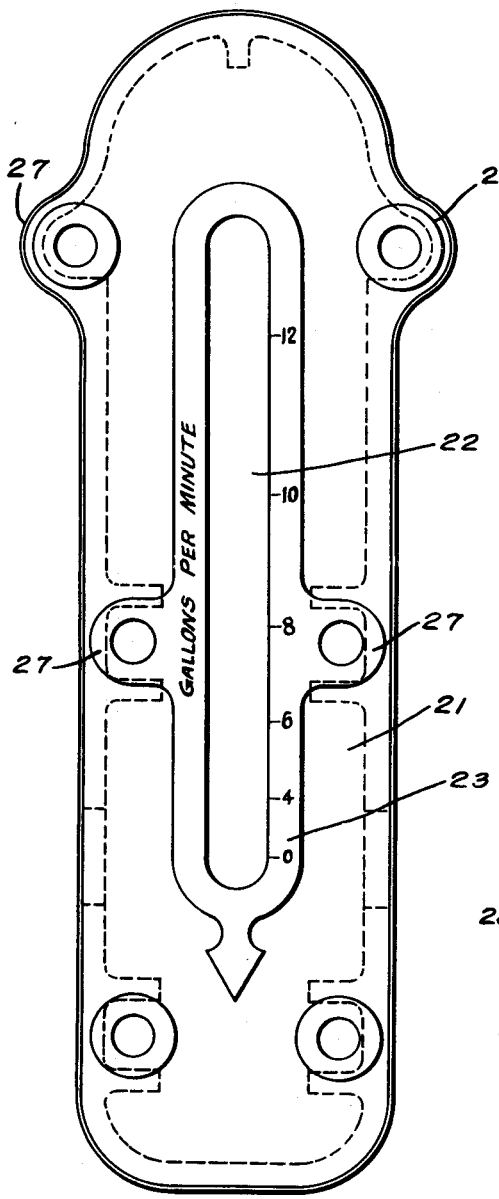
Fig. 3 is a face view of a manometer embodying my invention.
Figure 4:
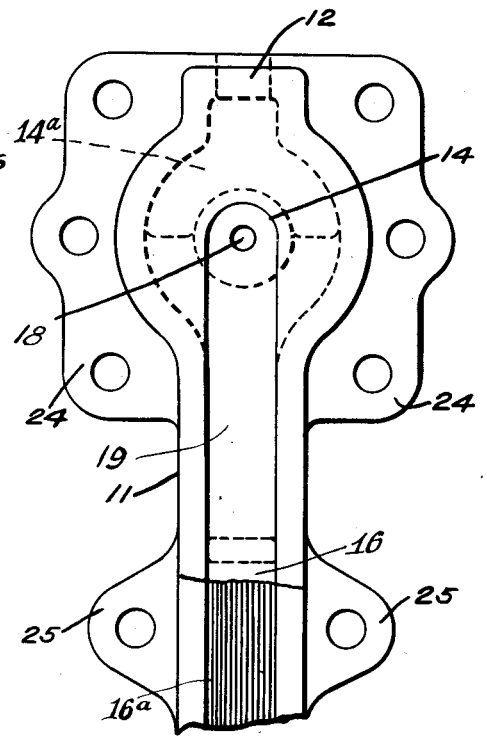
Fig. 4 is a fragmentary sectional view of my improved manometer taken along the line IV—IV in Fig. 2.

In the preferred embodiment of my invention, I provide a Venturi tube that is adapted for insertion in a fluid transmitting line. The Venturi tube 1 is characterized by having an intermediate section 2, or throat portion, of reduced cross-sectional area. Above the section 2, in the direction of fluid movement, the tube 1 broadens out into a threaded portion 3 which is of the diameter of the connecting pipe. Below the section 2, the tube expands with a uniform tapered surface 4 to a threaded portion 5 for connection to the associated connecting pipe. The wall of the tube 1 is pierced by an aperture 6 at the mid-point of the section 2, while a larger aperture 7 extends through the wall of the tube 1 at a point above the section 2.

That portion of the tube 1 through which the apertures 6 and 7 extend is thickened into a flange 8 which is provided with a plurality of bolt holes 9.

The manometer comprises a base or channel member 11 which is in the form of a shallow receptacle, the end walls of which are provided with apertures 12 for the reception of threaded plugs 13. A lug 14 extends upwardly from the bottom of the base member 11 and is flush with the upturned edges thereof. The lug 14 is provided with a longitudinally extending aperture 15 of the same diameter as the aperture 6 and that registers therewith. Said lug 14 also in part defines an aperture 14a registering with the aperture 7.

A cover member or plate 16 is adapted to be fitted over the upstanding edges of the base member 11 and is provided with apertures 17 and 18, the latter being of the same diameter as the aperture 15. The plate 16 is provided with a longitudinally extending groove 19. A glass plate 22 is disposed over the groove 19 to therewith provide a chamber 20. The plate 22 is held in position by a cover member 21 having an opening therein extending along the chamber 20. A suitable scale 23 may be provided on the cover member 21 adjacent to the glass plate 22. The plate 16 in part defines a passage 16a while the plate 22 in part defines the chamber or passage 20. Passages 16a and 20, in the example shown, extend at right angles to the passages 14a and 15.

The base member 11 is provided with a plurality of extending flanges 24 and 25 which co-operate with the flange 8 on the tube 1 and apertured portions 26 and 27 on the cover member 21 for the reception of suitable bolts 28 to secure the manometer and the Venturi tube in their assembled position. The several metallic portions of the manometer and Venturi tube are packed by suitable gaskets 29.

Figure 5:
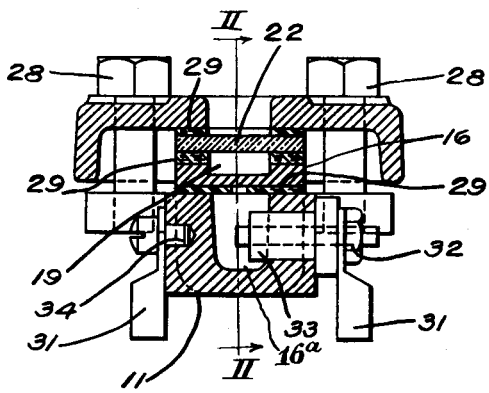
Fig. 5 is a cross-sectional view of the manometer taken along the line V—V in Fig. 2.

In Fig. 5, is shown a pair of terminals 31 which may be connected to any external electrical circuit in order to operate an alarm. One of the terminals 31 is attached to the stationary contact member 32 which extends through an opening in the base member 11 but is suitably insulated, as at 33, therefrom.

The other terminal 31 is secured directly to the wall of the base member 11. The chamber defined by the base member 11 and the cover member or plate 16 is partially filled with suitable liquid 35, such as mercury, a portion of which flows through the aperture 17 into the chamber 20.

The operation of my improved Venturi tube and manometer is as follows: A column of fluid in passing through the Venturi tube 1 enters by the connection 3 and departs by the connection 5 after having passed through the throat portion 2. It is a well known fact that the fluid above the throat portion 2 is under a greater pressure than the portion at that section. Also, the velocity of the fluid above the section 2 is less than the velocity of the fluid at the section 2. The difference in pressure above and at the portion 2 is proportional to the amount of fluid traversing the Venturi tube 1.

This difference in pressure is transmitted to the manometer. A certain portion of the fluid from the Venturi tube traverses the aperture 7 and moves into the chamber defined by the base member 11 and the plate 16. This fluid tends to displace the mercury 35 which moves upwardly in the chamber 19. However, another column of fluid moves from the portion 2 through the passageway formed by the apertures 6, 15 and 18 into the chamber 20 and exerts a back pressure on the column of mercury. When a sufficient amount of mercury has been forced into the chamber 20, to equalize the difference between the pressures in the aperture 7 and the aperture 6, the mercury column will come to rest. When the height of the column of mercury in the chamber 20 is read on the properly indicated scale 23, a direct measure of the amount of fluid traversing the Venturi tube 1 is given.

In order to magnify slight movements of the mercury in the chamber 16a defined by the base member 11 and the cover member 16, it has been found advisable to make the cross-sectional area of the chamber 20 very materially smaller than the cross-sectional area of the chamber 16a.

In the event that an electric alarm is desired to be given when the column of mercury in the main chamber has reached a predetermined level, contact is made or broken, as the case may be, between the stationary contact member 32 and the contact member 34 embedded in the member 11.

It will thus be seen that I have provided a combined Venturi tube and manometer which are of substantially unitary structure when assembled and which comprise a small number of parts, each of said parts being of suitable design for manufacturing purposes.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a flow-indicator, a base member having an aperture extending therethrough and partially defining a chamber, an apertured lug extending through said chamber, a cover member for said chamber partially defining a second chamber and embodying means affording communication between said chambers, said cover member having an opening registering with the aperture in said lug, means comprising a cover member for said second chamber, and clamping means for securing said parts in assembled relation.

2. In a flow-indicator, a base member having an aperture extending therethrough and partially defining a chamber, an apertured lug extending through said chamber, a cover member for said chamber partially defining a second chamber and embodying means affording communication between said chambers, said cover member having an opening registering with the aperture in said lug, means comprising a cover member for said second chamber, a scale disposed adjacent said second cover member, and clamping means for securing said parts in assembled relation.

3. In combination, a channel member provided with a plurality of ports, one of which communicates with the channel of said member, a second member defining with said channel member one leg of a manometer, and means comprising a member spaced from said second member and and defining therewith another manometer leg communicating with said first leg, and means affording a direct communication between said second leg and another of said ports.

4. In combination, a channel member provided with a plurality of ports, one of which communicates with the channel of said member, a grooved member defining with said channel member one leg of a manometer, and means comprising a member spaced from said grooved member and defining therewith another manometer leg communicating with said first leg and means affording a direct communication between said second leg and another of said ports.

5. In combination, a channel member provided with a plurality of ports, one of which communicates with the channel of said member, a grooved member defining with said channel member one leg of a manometer, and means comprising a light-transmitting member spaced from said groved member and defining therewith another manometer leg communicating with said first leg and means affording a direct communication between said second leg and another of said ports.

6. In combination, a channel member provided with a plurality of ports, one of which communicates with the channel of said member, a grooved member defining with said channel member one leg of a manometer, means comprising a light-transmitting member spaced from said grooved member and defining therewith another manometer leg communicating with said first leg, means affording a direct communication between said second leg and another of said ports, and a cover member having a sight opening disposed adjacent said light-transmitting member.

7. A flow indicator comprising means providing a vertical manometer chamber and a vertical supporting element therefor supported solely adjacent to its upper end and extending substantially throughout the length thereof, said element having spaced openings in a single mounting face adjacent its upper end and providing passages from said chamber to said openings.

8. A flow indicator comprising means providing a vertical manometer chamber and a one-piece element supported solely adjacent to its upper end and extending substantially throughout the length thereof, said element constituting the sole support for said means, said element having spaced outer-surface openings each disposed adjacent to the upper end thereof and providing passages from said chamber to said openings.

9. A flow indicator comprising means providing a vertical manometer chamber and a one-piece vertical upright supporting element therefor of substantially the length thereof and having its sole mounting portion adjacent to its uper end, said mounting portion having spaced exterior-surface openings in said upper-end portions and providing passages from said chamber to said openings.

In testimony whereof, I have hereunto subscribed my name this 23rd day of August, 1923.

LELAND H. HILL.